United States Patent [19]

Rojas et al.

[11] Patent Number: 4,963,810
[45] Date of Patent: Oct. 16, 1990

[54] VARIABLE LOAD MOTOR DRIVE CONTROL

[75] Inventors: Alejandro D. Rojas, Santa Ana; John J. Ouintus, Buena Park, both of Calif.

[73] Assignee: Archive Corporation, Costa Mesa, Calif.

[21] Appl. No.: 428,096

[22] Filed: Oct. 27, 1989

[51] Int. Cl.$^5$ .................. H02P 5/16; G05B 11/28
[52] U.S. Cl. .................. 318/778; 318/432; 318/7; 318/6; 360/73.060; 388/819
[58] Field of Search .................. 318/5, 6, 7, 560-532, 318/430-434, 776-819; 388/800-820; 360/73, 70, 71; 242/18 R, 18 DD, 45, 18 CS, 56 R, 190, 75.51, 186, 189, 250, 252, DIG. 1

[56] References Cited

U.S. PATENT DOCUMENTS

| | | | |
|---|---|---|---|
| 3,526,819 | 9/1970 | Graf | 318/327 X |
| 3,551,775 | 12/1970 | Safiuddin | 318/434 |
| 3,670,237 | 6/1972 | Hubel et al. | 318/431 X |
| 3,781,620 | 12/1973 | Toth | 388/817 |
| 3,812,409 | 5/1974 | Dinger | 388/817 |
| 3,965,405 | 6/1976 | Romano | 318/432 X |
| 4,072,883 | 2/1978 | Beiter | 318/6 X |
| 4,109,184 | 8/1978 | Weber | 388/814 |
| 4,152,758 | 5/1979 | Bailey et al. | 388/819 X |
| 4,268,782 | 5/1981 | Kawada et al. | 318/434 |
| 4,322,747 | 3/1982 | Dischere et al. | 360/73.06 X |
| 4,519,039 | 5/1985 | Surana et al. | 318/7 X |
| 4,520,450 | 5/1985 | Snedden et al. | 318/7 X |
| 4,532,597 | 7/1985 | Safiuddin et al. | 318/6 X |
| 4,800,450 | 1/1989 | Rodal et al. | 360/73.06 |
| 4,823,057 | 4/1989 | Eley | 318/432 |

Primary Examiner—William M. Shoop, Jr.
Assistant Examiner—Paul Ip
Attorney, Agent, or Firm—Eugene H. Valet

[57] ABSTRACT

The invention relates to a method and apparatus for making low inertia motors useful under circumstances where the load exerting drag on the motor during start-up acceleration may be different from time to time. A ramped drive current as opposed to a conventional constant current limit signal is applied to the motor. The invention is particularly useful, for example, in magnetic tape drives which must adapt to variations in drag between one tape cassette or cartridge and another.

9 Claims, 4 Drawing Sheets

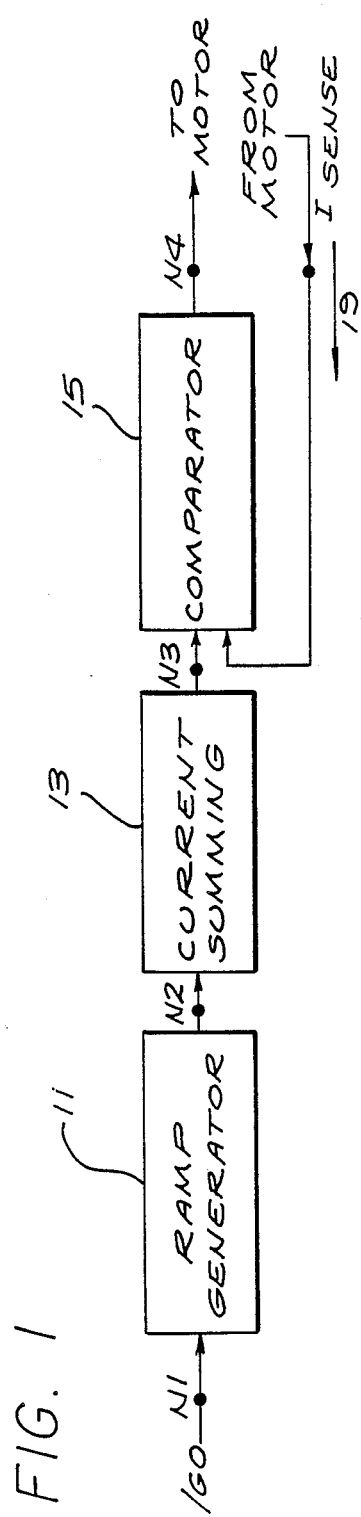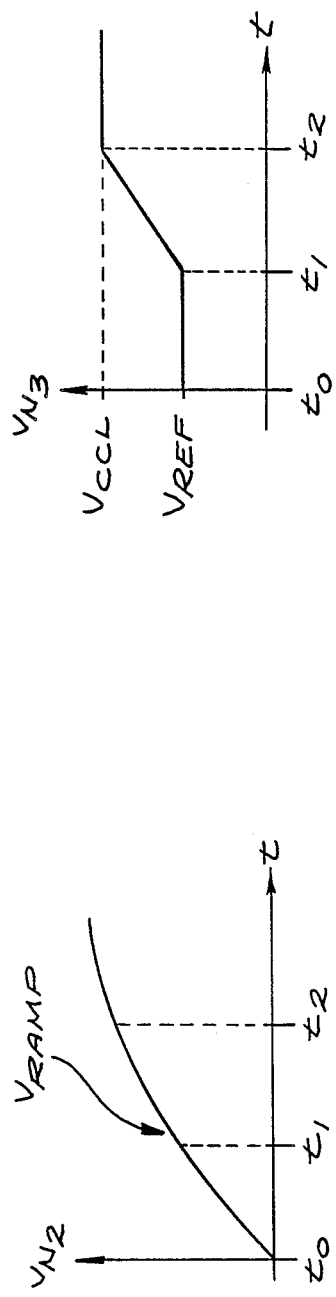

VARIABLE LOAD MOTOR DRIVE CONTROL

BACKGROUND OF THE INVENTION

1. Field of the Invention

The present invention relates generally to motor drive circuitry, such as may be used in magnetic tape storage devices for computer applications, and, more specifically, to a method and apparatus for making low inertia motors useful in tape drives.

2. Description of the Related Art

From their inception, digital computers have required some form of data storage as an adjunct to their relatively sparse main memory facilities.

Magnetic tape devices are a fast, efficient, economical means for storing computer data such as for backing-up hard disk software application programs and user data created using the programs, or for off-line file management tasks routinely implemented between a disk and tape as the data is processed. These devices, using tape cartridges with ¼ inch, 8 mm, and 4 mm tape, are available for storing data in capacity ranges that match the requirements of small to medium computer systems. For example, commercially available devices can store up to 525 megabytes of digital data on quarter-inch tape in cartridges which load into 5 ¼ inch form factor, half-height drives that can be plugged into the same slot that a floppy disk drive can be installed.

Streaming magnetic tape drives, also called streamers, are constant speed transports for storing information from hard drives to provide backup. Such drives generally record bidirectionally, laying down as many parallel tracks as tape head technology will permit; current technology is about twenty-six tracks on quarter-inch tape. A description of computer tape drive technology can be found, for example, in *STREAMING*, Copyright 1982, Archive Corporation, Library of Congress Catalog No. 82-072125.

In order to reduce power consumption during a drive's start-up sequences, it is preferable to use low inertia motors. Moreover, such motors are smaller and more economical. However, a motor with low inertia, in comparison to the load it must accelerate, would cause acceleration to vary proportionally with the load. Consequently, the time to reach operating speed would also vary proportionately with the load.

In accordance with specifications, generally established by groups such as the American National Standards Institute (ANSI) and the Quarter-Inch Committee (QIC), the load on the motor caused by a QIC tape cartridge can vary from approximately one ounce to approximately 5.5 ounces. Therefore, drag will vary from tape cartridge to tape cartridge. Additionally, drag can change with the age of the cartridge depending on its frequency of use and an operational temperature conditions. Moreover, the drag on the motor will vary directly with the tape speed.

Since the load of the cartridge varies at a ratio of approximately 5.5:1, the start-up time of the tape drive can vary five-hundred and fifty percent if a low inertia motor is used. This makes it difficult to meet the worst-case "up to speed time" of 300 milliseconds as established in the QIC industry standard equipment specification.

Moreover in any case, the maximum acceleration a cartridge is specified to withstand is 1,500 inches/-second/second. Thus, if a drive motor current limit is set such that a high drag cartridge comes up to speed within the worst-case time limit, a low drag tape inserted the same drive be destroyed since five and one-half times the amount of necessary energy is supplied on start-up. On the other hand, if the current limit is set such that a low drag cartridge will start-up well within the QIC specification, a high drag cartridge will only start-up well beyond the specification time limit.

Clearly, the benefits of low inertia motors—equipment miniaturization, reduction of power consumption, economy—are offset by the problem of meeting the acceleration specifications.

SUMMARY OF THE INVENTION

It is an advantage of the present invention that it allows the use of low inertia motors in tape drives.

It is another advantage of the present invention that it allows low drag tape cartridges to receive less energy during tape drive start-up sequences while high drag cartridge receive more energy as time progresses.

It is yet another advantage of the present invention that QIC acceleration, also called "up to speed time," standards can be met.

It is a further advantage of the present invention that it may be used to allow low inertia motors to cope with variable load conditions.

It is yet a further advantage of the present that it is adaptable by a person skilled in the art to any variable load use which would benefit by conversion to a low inertia motor.

In a basic aspect, the present invention provides a method for assisting low inertia motors to cope with variable loads by providing an initial minimum current to said motor to overcome initial rest state inertia and said load, ramping said current upwardly from said minimum at a controlled rate which will bring said motor and said load within an operational speed tolerance within a desired time limit regardless of load variations, and limiting current to said motor to prevent said motor from exceeding desired acceleration.

In another basic aspect, the present invention provides apparatus, coupled to a device such as a computer or microprocessor for signalling start-up of a motor, responsive to said start-up signal, for ramping start-up drive current to said motor, said motor having an input for said drive current and an output indicating current through said motor. The apparatus comprises a ramp voltage generator having an input coupled to a said device and an output coupled to a current summor input, having an output for providing a reference voltage, an a current comparator, having a first input coupled to said output of said current summor and a second input coupled to said motor output, and an output coupled to said motor input.

Other objects, features and advantages of the present invention will become apparent upon consideration of the following detailed description and the accompanying drawings, in which like reference designations represent like features throughout the FIGURES.

BRIEF DESCRIPTION OF THE DRAWINGS

FIG. 1 is a schematic block diagram of the preferred embodiment of the present invention, where FIG. 1A is a graphical depiction of the signal waveform at node N2 of the invention of FIG. 1, and FIG. 1B is a graphical depiction of the signal waveform at node N3 of the invention of FIG. 1.

Figure 3:
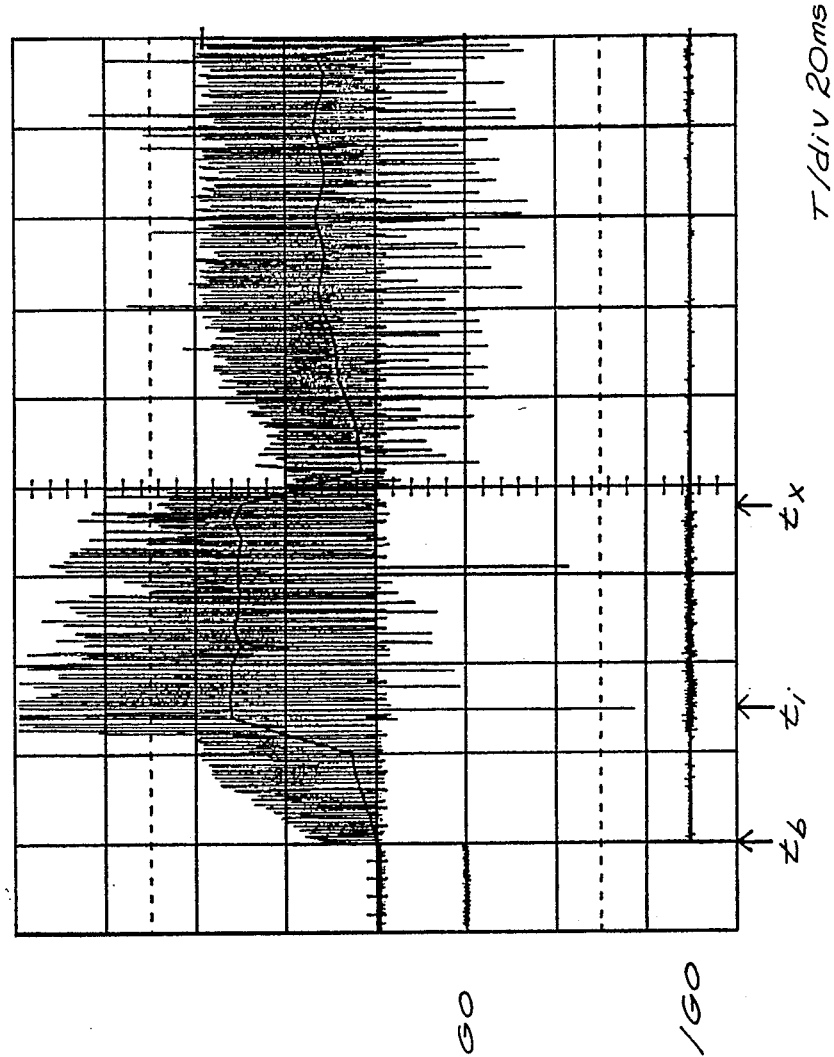
FIG. 3 (PRIOR ART) is a graphical depiction of application of a constant current over time to a conventional constant limit drive motor for a tape drive.
Figure 4:
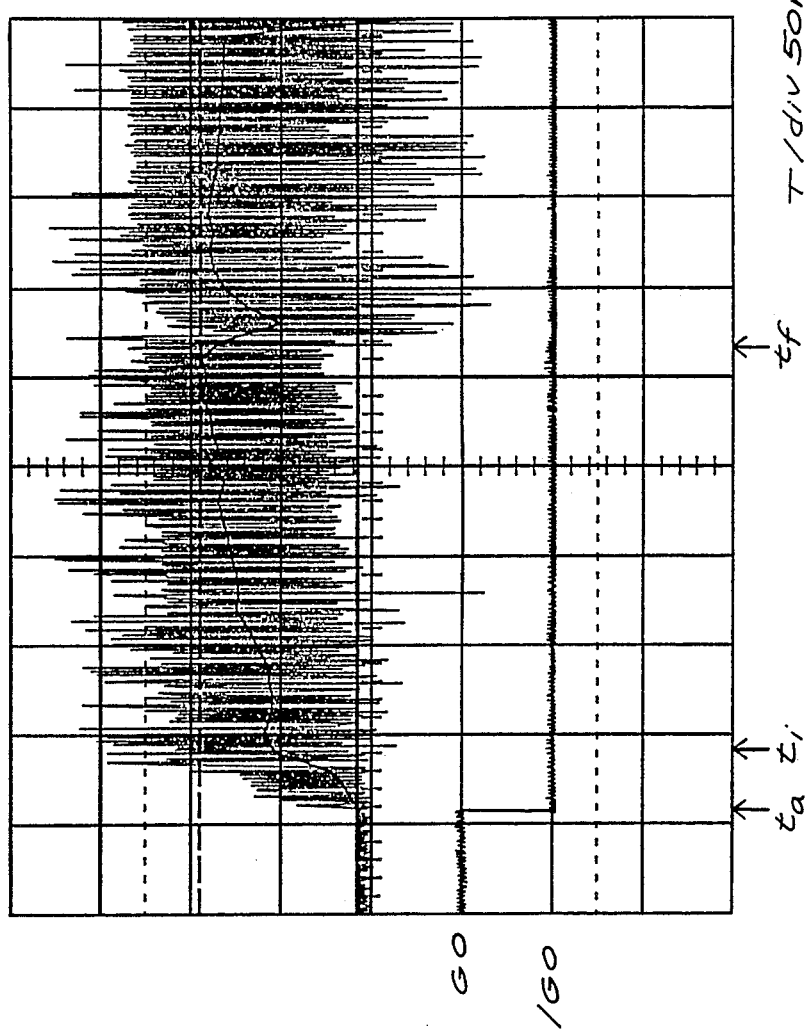
FIG. 4 is a graphical depiction of application of a ramped current over time to a low inertia motor for a tape using the present invention as shown in FIG. 1, node N4.

Note that FIGS. 3 and 4 have different time scales.

Other objects, features and advantages of the present invention will become apparent upon consideration of the following detailed description and the accompanying drawings, in which like reference designations represent like features throughout the FIGURES.

The drawings and graphs referred to in this description should be understood as not being drawn to scale except if specifically noted.

DETAILED DESCRIPTION OF THE INVENTION

Reference is made now in detail to a specific embodiment of the present invention, which illustrates the best mode presently contemplated by the inventor(s) for practicing the invention. Alternative embodiments are also briefly described as applicable. While the invention is described with respect to an application in streaming tape drives, it will be obvious to a person skilled in the art that the disclosed invention would be applicable to any implementation where a low inertia motor could be advantageously employed.

Figure 2:
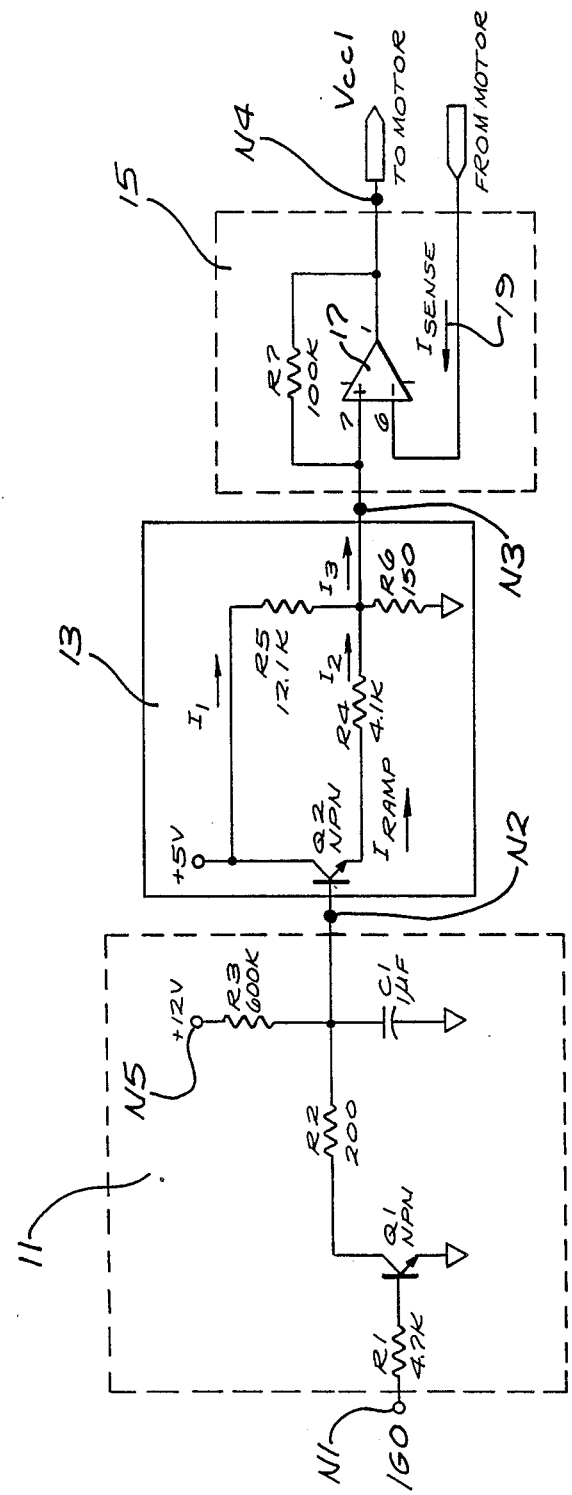
FIG. 2 is a circuit diagram of an exemplary implementation of the present invention as shown in FIG. 1.

Referring now to FIGS. 1 and 2, when it is determined, for example by a computer central processing unit ("CPU") that a tape drive at-rest should begin streaming the tape such as when data is to be written or read, a motor start-up, digital signal, /GO, is sent to node N1 which is applied to the input of a ramp generator 11.

The ramp generator 11, being turned on by /GO generates a voltage ramp output, Vramp, to node N2 as shown in FIG. 1A. Vramp is applied to the input of summing circuitry 13. (Looking briefly to FIG. 3, for the present exemplary embodiment of FIG. 2 discussed later, signal /GO has been selected to be a negative transition as shown at time $t_a$; that is, when /GO is a low, the motor (not shown) is to be turned on.)

When /GO is high, the output of summing circuitry 13 is a constant current, to be referred to as I1. Thus, before $t_a$ when /GO is high, there is an output voltage, Vref as indicated in FIG. 1B from $t_0$ to $t_1$, at node N3 and on the threshold input of current comparator 15. The output of comparator 15 is a digital current limit signal to the motor.

When /GO goes low at $t_a$ (FIG. 3), Vramp begins to climb as shown in FIG. 1A at node N2. At time $t_1$, the input of the summing circuit 13 becomes such that Vref begins to ramp as shown in FIG. 1B. As a result, the summing circuit 13 begins to provide an additional increasing current, to be referred to as I2 (FIG. 2). The output current, I3, of the summing circuit 13 (FIG. 2) when /GO goes low is now the sum of I1 and I2, which develops a ramped voltage at node N3 via resistor R6; this is the ramped threshold which determines the instantaneous current limit to the motor.

As motor controllers and low inertia motors are well known in the art, an explanation is not necessary to the understanding of the present invention. As will be obvious to a person skilled in the art, the current through the motor can be sensed, Isense (FIG. 2), and returned to the comparator as indicated by arrow 19. When the motor is off, viz. when /GO is high, Vref at node N3 will thus be at its initial value.

At time $t_2$ (FIGS. 1A and 1B), the comparator 15 (FIG. 1) will sense that current I3 (FIG. 2) to the comparator has reached the maximum desired value by determining that a current limiting voltage, Vccl (FIG. 1B), set by summing circuit has been reached on node N3 (FIGS. 1 and 2). Current I3 will have ramped up to its maximum, Ifinal, being the sum of currents I1 (Iref) plus I2max. Therefore, the motor will be up to speed.

Turning now to FIG. 2, an exemplary embodiment of the detailed circuitry of the invention as shown in FIG. 1 is schematically depicted. It will be recognized that specific circuit components must be tailored to the needs of the particular motor to be driven and the drag effects expected. A detailed description of the electronic circuitry of FIG. 2 follows.

When /GO is high, vis. the motor is directed to a stopped condition or is off. Q1 of the ramp generator 11 is turned on with the collector of Q1 shorted to ground so that capacitor C1 can discharge with R2 serving as a current limiter to protect Q1. The voltage output of the ramp generator at node N2 in this condition is zero.

Under this condition (viz., /GO is high), Q2 of summing circuitry 13 is turned off (Q2 being open) and I1 as controlled by R5 and R6 is the reference current, Iref, to node N3 and the comparator 15 input 7 as Vref shown in FIG. 1B. Since the motor is off, Isense is zero and the voltage applied to the threshold input 7 of the comparator 15 is Vref as shown in FIG. 1B.

The CPU indicates that tape motion is to start for whatever purpose the application or utility software needs, e.g. to back-up a hard disk. By pulling signal /GO low at N1, opening Q1 and allowing the 12 volt source to charge capacitor C1. The RC circuit, R3 and C1, will control the ramp of the voltage output of the ramp generator 11 at N2. As C1 charges, Vramp will exceed the turn on threshold voltage of Q2 at $t_1$ as shown in FIG. 1B. Thus, at time $t_1$, Q2 will turn on and current Iramp will begin to climb, flowing through R4 as I2; R4 will control the slope of current Iramp. The currents I1 and I2 will be summed through R6 and thus will apply the controlled ramp voltage at node N3 as depicted in FIG. 1B from time $t_1$ until time $t_2$.

At time $t_2$, Q2 is full turned on and $V_{N3}$ reaches Vccl as R4 and R5 act in parallel and I3 reaches Ifinal which is the motor-on maximum current limit through node N3.

During the period $t_1$ through $t_2$ (FIG. 1B), a threshold voltage for comparator 17 is being established on pin 7 by $V_{N3}$ as shown in FIG. 1B. During this same time interval, should the voltage at pin 6 (proportional to Isense) exceed the voltage at pin 7, the comparator 17 is triggered which cuts off output voltage at node N4 to the motor. The hysterysis of the comparator 15 is set by R7.

A comparison is shown in FIGS. 3 and 4 of Isense without and with the use of the present invention, respectively. That is, FIG. 3 shows the actual current and a computer generated average current input to the motor controller circuitry. At time $t_b$ FIG. 3, a "soft-start" current is applied to the motor to overcome rest inertia while preventing damage to the motor which would be caused by initial transient input. In FIG. 3, once the motor has been given a chance to soft-start, a constant current is applied from $t_i$ through $t_x$. [As will be recognized by a person skilled in the art, when the motor has come up to speed, the tape in the cartridge comes up to speed and less accelerations is asserted by the motor on the cartridge.]Thus, FIG. 3 depicts a traditional constant current limit approach to motor acceleration with the constant current applied from $t_i$ to $t_x$.

FIG. 4 shows the same soft-start using the present invention to control the motor current input from $t_i$ until $t_f$. In this comparative example, FIG. 4 depicts a low inertia motor with appropriate motor controller circuitry utilized in a tape drive with a tape cartridge which was measured to have a pull drag of approximately 5.5 ounces at 120 inches per second (psi), a high drag cartridge.

The conclusion which can be drawn from this comparison is that in the constant current limit approach with a low inertia motor as shown in FIG. 3, the time $t_b$ to $t_x$—approximately 450 milliseconds—will exceed the worst case time allowed by the industry standards. In contrast, FIG. 4 shows that the use of a ramped current by the present invention reduces the up to speed time to approximately 280 milliseconds, i.e., well within the standard specifications.

The foregoing description of the preferred embodiment of the present invention has been presented for purpose of illustration and description. It is not intended to be exhaustive or to limit the invention to the precise form disclosed. Obviously, many modifications and variations will be apparent to practitioners skilled in this art. Similarly, any process steps described might be interchangeable with other steps in order to achieve the same result. The embodiment was chosen and described in order to best explain the principles of the invention and its best mode practical application to thereby enable others skilled in the art to understand the invention for various embodiments and with various modifications as are suited to the particular use contemplated. It is intended that the scope of the invention be defined by the claims appended hereto and their equivalents.

What is claimed is:

1. An apparatus, coupled to a device for signalling start-up of a motor, responsive to said signal, for providing start-up drive current to said motor, said motor having an input for said drive current and an output indicating current through said motor, comprising:
   means for generating a ramp voltage on an output, having an input coupled to said device;
   means for summing currents, having an input coupled to the output of said means for generating a ramp voltage, having an output for providing a reference voltage; and
   means for comparing currents, having a first input coupled to said output of said means for summing currents and a second input coupled to said motor output, and an output coupled to said motor input,
   whereby said start-up drive current to said motor is ramped.

2. The apparatus as set forth in claim 1, wherein said motor is a low inertia motor.

3. The apparatus as set forth in claim 2, wherein in said means for summing currents further comprises:
   a limiting means for determining a maximum current on said output.

4. The apparatus as set forth in claim 3, wherein said reference voltage is indicative of instantaneous current limit on the current to be provided to said motor.

5. An apparatus, coupled to a device for signalling start-up of a low inertia motor for loads which may exert a variable drag factor on said motor, responsive to said signal, for ramping start-up drive current to said motor, said motor having an input, via motor controller means, for said drive current and an output, via said motor controller means, indicating current through said motor, comprising:
   voltage ramp generator means for providing a predetermined ramped voltage on an output in response to said signal on an input coupled to said device;
   current summing means, having an input coupled to the output of said generator and having an output for providing a reference voltage ramping proportionately with currents summed in said current summing means; and
   current comparator means, having a first input coupled to said output of said means for summing currents an a second input coupled to said motor output, for comparing said inputs, and an output coupled to said motor input, for providing said start-up drive current to said motor,
   whereby said start-up drive current to said motor is ramped at an acceleration rate which is proportional to said variable drag factor from said load.

6. The apparatus as set forth in claim 5, wherein in said means for summing currents further comprises:
   a limiting means for determining a maximum current on said output.

7. The apparatus as set forth in claim 6, wherein said reference voltage is indicative of instantaneous current limit of the current to be provided to said motor.

8. In a magnetic tape recording device, having motor controller circuitry controlling a low inertia motor for turning a tape take-up reel exerting a variable load in the form of drag on said motor, an improved apparatus for sending drive current to said motor via said circuitry in response to a signal from a host computing device to start-up said reel and for bringing said reel to operational speed with controlled acceleration in a desired period of time, said improved apparatus comprising:
   a ramp generator, having an input coupled to said host computer for receiving said start-up signal, and providing a ramped voltage output;
   a current summing circuit, having an input coupled to said ramped voltage output and an output providing a reference current output when said start-up signal is in a first state indicating said motor is to be stopped and providing a ramped current output when said start-up signal switches from said first state to a second state indicating that said motor is to begin turning and accelerating said reel, said summing circuit further having a limiter for determining a maximum current on said output; and
   a comparator, having a first input coupled to said current summing circuit output and a second input coupled to said motor controller circuitry for sensing the actual current to said motor and an output coupled to said motor controller circuitry for delivering said drive current,
   whereby said drive current controls acceleration of said motor and said load based upon said loads drag effect on said take-up reel.

9. The apparatus as set forth in claim 8, wherein said reference voltage is indicative of instantaneous current limit of the current to be provided to said motor.

* * * * *